(12) United States Patent
Dolby et al.

(10) Patent No.: US 8,572,674 B2
(45) Date of Patent: Oct. 29, 2013

(54) SYSTEM, METHOD, AND APPARATUS FOR MODULAR, STRING-SENSITIVE, ACCESS RIGHTS ANALYSIS WITH DEMAND-DRIVEN PRECISION

(75) Inventors: Julian Timothy Dolby, New York City, NY (US); Emmanuel Geay, White Plains, NY (US); Marco Pistoia, Amawalk, NY (US); Barbara G. Ryder, Blacksburg, VA (US); Takaaki Tateishi, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 1359 days.

(21) Appl. No.: 12/190,718

(22) Filed: Aug. 13, 2008

(65) Prior Publication Data

US 2010/0043048 A1 Feb. 18, 2010

(51) Int. Cl.
*H04L 29/06* (2006.01)
(52) U.S. Cl.
USPC .............................................. 726/1; 713/150
(58) Field of Classification Search
USPC .................. 726/1; 380/35; 717/126, 177, 178
See application file for complete search history.

(56) References Cited

U.S. PATENT DOCUMENTS

| | | | | |
|---|---|---|---|---|
| 5,797,012 A * | 8/1998 | Blainey et al. | ................ | 717/157 |
| 6,077,313 A * | 6/2000 | Ruf | ................ | 717/155 |
| 7,620,946 B2 * | 11/2009 | Russell | ................ | 717/157 |
| 8,141,049 B2 * | 3/2012 | Kahlon | ................ | 717/126 |
| 2006/0101413 A1 * | 5/2006 | Kinno et al. | ................ | 717/127 |
| 2009/0007223 A1 * | 1/2009 | Centonze et al. | ................ | 726/1 |
| 2009/0094667 A1 * | 4/2009 | Habeck et al. | ................ | 726/1 |
| 2011/0093484 A1 * | 4/2011 | Bando et al. | ................ | 707/758 |
| 2011/0126282 A1 * | 5/2011 | Centonze et al. | ................ | 726/21 |
| 2012/0233599 A1 * | 9/2012 | Valdiviezo Basauri et al. | ................ | 717/126 |

OTHER PUBLICATIONS

Mark Weiser; Program Slicing; Yea: 1981; University of Maryland; pp. 1-11.*
J. Bergeron; Static Analysis of Binary Code to Isolate Malicious Behaviors; Year: Sep. 9, 2009; IEEE;pp. 1-6.*

* cited by examiner

*Primary Examiner* — Mohammad W Reza
*Assistant Examiner* — Monjour Rahim
(74) *Attorney, Agent, or Firm* — August Law, LLC; George Willinghan

(57) ABSTRACT

A static analysis for identification of permission-requirements on stack-inspection authorization systems is provided. The analysis employs functional modularity for improved scalability. To enhance precision, the analysis utilizes program slicing to detect the origin of each parameter passed to a security-sensitive function. Furthermore, since strings are essential when defining permissions, the analysis integrates a sophisticated string analysis that models string computations.

24 Claims, 5 Drawing Sheets

- Initialization: Call to main method $m' \in M$ $$\langle S, \varepsilon, \{t_0\}, \alpha_0 \rangle \Rightarrow \langle S', \pi(m')\varepsilon, \{t_0\}, \alpha_0 \rangle$$

- Method Call: $m \in M$ calls $m' \in M$ $$\langle S, \sigma w, T, \alpha \rangle \Rightarrow \begin{cases} \langle S', (\pi(m) \cap Q)\sigma w, T, \alpha \rangle, & m' \text{ is the privilege-asserting API with parameter } Q \subseteq P \\ \langle S', (\sigma \cap \pi(m'))\sigma w, T \cup \{t\}, [\alpha|t \mapsto \sigma \cap \pi(m')] \rangle & m' = \langle \text{init} \rangle, \text{creating Thread instance } t \\ \langle S', (\pi(m') \cap \alpha(t))\sigma w, T, \alpha \rangle, & m = \text{start} \wedge m' = \text{run} \wedge m, m' \text{ have Thread receiver } t \\ \langle S', \sigma \sigma w, T, \alpha \rangle, & m' \text{ is checkPermission/Demand with parameter } p \in \sigma \\ \text{ERROR}, & m' \text{ is checkPermission/Demand with parameter } p \notin \sigma \\ \langle S', (\sigma \cap \pi(m'))\sigma w, T, \alpha \rangle & \text{otherwise} \end{cases}$$

- Method Return $$\langle S, \sigma w, T, \alpha \rangle \Rightarrow \langle S', w, T, \alpha \rangle$$

Stack-Inspection Eager Concrete Semantics

```
public class Library {
   private static final String dir = "C:";
   private static final String logFileName = "log.txt";
   private static final int port = 80;
   public static Socket createSocket(final String host)
         throws Exception {
      Socket socket = new Socket (host, post);
      PrivWrite op = new PrivWrite(dir, logfileName);
      FileOutputStream fos = (FileOutputStream)
            AccessController.doPrivileged(op);
      OutputStream bos = new BufferedOutputStream(fos);
      PrintStream ps = new PrintStream(bos, true);
      ps.print("socket: " + host + ":" + port);
      return socket;
   }
}
class PrivWrite implements PrivilegedExceptionAction {
   private final String dir;
   private final string fileName;
   PrivWrite(final String dir, final String fileName) {
      this.dir = dir;
      this.fileName = fileName;
   }
   public Object run() throws IOException {
      String fullFN = dir + File.seperator + fileName;
      return new FileOutputStream(fullFN)
   }
}
```

Library and PrivWrite Code

FIG. 1

```
public class Enterprise {
   private final String enterprise = "IBM";
   private final String domain = ".com";
   public void connectToEnterprise() throws Exception {
      String hostName = enterprise.toLowerCase() + domain;
      Socket s = Library.createSocket(hostName);
   }
}
```

Enterprise Code

FIG. 2

```
public class School {
   private final String school = "Rutgers";
   private final String domain = ".edu";
   public void connectToSchool() throws Exception {
      String hostName = school.toLowerCase() + domain;
      Socket s = Library.createSocket(hostName);
   }
}
```

School Code

FIG. 3

- Initialization: Call to main method $m' \in M$ $$\langle S, \varepsilon, \{t_0\}, \alpha_0 \rangle \Rightarrow \langle S', \pi(m')\varepsilon, \{t_0\}, \alpha_0 \rangle$$

- Method Call: $m \in M$ calls $m' \in M$ $$\langle S, \sigma w, T, \alpha \rangle \Rightarrow \begin{cases} \langle S', (\pi(m) \cap Q) \sigma w, T, \alpha \rangle, & m' \text{ is the privilege-asserting API with parameter } Q \subseteq P \\ \langle S', (\sigma \cap \pi(m')) \sigma w, T \cup \{t\}, [\alpha | t \mapsto \sigma \cap \pi(m')] \rangle & m' = \langle \text{init} \rangle, \text{creating Thread instance } t \\ \langle S', (\pi(m') \cap \alpha(t)) \sigma w, T, \alpha \rangle, & m = \text{start} \wedge m' = \text{run} \wedge m, m' \text{ have Thread receiver } t \\ \langle S', \sigma \sigma w, T, \alpha \rangle, & m' \text{ is checkPermission/Demand with parameter } p \in \sigma \\ \textbf{ERROR}, & m' \text{ is checkPermission/Demand with parameter } p \notin \sigma \\ \langle S', (\sigma \cap \pi(m')) \sigma w, T, \alpha \rangle & \text{otherwise} \end{cases}$$

- Method Return $$\langle S, \sigma w, T, \alpha \rangle \Rightarrow \langle S', w, T, \alpha \rangle$$

Stack-Inspection Eager Concrete Semantics

FIG. 4

YOR9200080323US1

```
<method>
    Ljave/lang/System.getProperty
    (Ljava/lang/String;)Ljava/lang/String;
</method>
<permissions>
    <permission>
        <name>Ljave/util/PropertyPermission</name>
        <target>*</target>
        <actions>read</actions>
        <param-index method="1" permission="1"/>
    </permission>
</permissions>
```

Summary of System.getProperty

FIG. 5

String $a = \text{"}xyz\text{"}$
for $(\text{int } i = 0; i < 3; i++) a = a + \text{"}a\text{"};$
String $r = a.substring(2);$ $$S_a \to x^{\{1\}} y^{\{1\}} z^{\{1\}}$$
$$S_a \to \underline{concat}^3 (S_a, a^{\{2\}})$$
$$S_r \to \underline{substring}^4 (S_a, 2)$$

Sample Program and Production Rules

FIG. 6

SYSTEM, METHOD, AND APPARATUS FOR MODULAR, STRING-SENSITIVE, ACCESS RIGHTS ANALYSIS WITH DEMAND-DRIVEN PRECISION

FIELD OF THE INVENTION

The present invention relates to access-control systems.

BACKGROUND OF THE INVENTION

Operating-system access control allows restricting access to protected resources based on the identities of the authenticated user who is executing a program. Modern run-time environments, such as Java and the Microsoft .NET Common Language Runtime (CLR), in which the programs under execution are obtained by dynamically assembling components, have made it necessary to extend the notion of authenticated user. In such systems, there is the need for a code provider to undergo an authentication and authorization process much the same way as the users who execute the final program. At run time, when different components are dynamically combined to form a program, a component provider can behave as an active attacker and violate the integrity of the system by injecting into the program a component that performs operations that the system administrator did not intend to authorize, such as reading private information from the user's home directory, opening a network connection, and communicating that information to a remote server.

A component can authenticate itself based on its origin in the network and the digital signature applied by the component provider before distribution. The system administrator assigns "permissions" to authenticated components. A permission is the right to access a restricted resource or to perform a security-sensitive operation. At run time, when a component attempts, directly or indirectly, to access a restricted resource or to perform a security-sensitive operation, the underlying run-time environment will demand that the component prove possession of the necessary permission.

Once components are assembled to form a program, a system administrator installing the program configures its access-control policy. In the software lifecycle, this challenge is faced also by component developers and providers, who are encouraged to publish permission recommendations for their components before distributing them, and system administrators, who are supposed to define access-control policies at deployment time. A policy that is too permissive constitutes a violation of the Principle of Least Privilege, which establishes that a user or program should never be granted more permissions than those strictly required to function correctly. If the policy is too restrictive, the program will not function properly due to run-time authorization failures. Source code may not be available, so manual code inspection, besides being tedious, time consuming and error prone, may not even be an option.

One alternative technique is dynamic analysis. With this technique, a component is tested, initially with no permissions. Any attempt by the component to directly or indirectly access a restricted resource will result in a run-time authorization failure. Typically, each failure is logged, and the access-control policy is updated by granting the component the missing permissions, assuming that it is safe to do so. The program is then restarted. This process is reiterated until no more authorization failures are found. In general, however, there is no guarantee that the access-control policy obtained at the end of this process will be sufficient to execute the program without authorization failures. Absence of a complete suite of test cases can leave some execution paths undiscovered until deployment, thereby exposing the deployed program to unjustified authorization failures. Furthermore, executing a potentially malicious program, even just for testing, can be harmful.

SUMMARY OF THE INVENTION

Systems, methods and apparatus in accordance with the present invention utilize static analysis. The advantage of static analysis is that, without executing a program, all the possible paths of execution are modeled. Therefore, static analysis is capable of detecting all the permission requirements, with no false negatives. The risk is that, if the analysis is too conservative, it will compute false positives, i.e., permissions that are not actually needed. Granting those extra permissions may result in violations of the Principle of Least Privilege. Systems and methods in accordance with the present invention combine string analysis with a demand-driven-precision permission-tracking algorithm to reduce the number of false positives.

Permission analysis in accordance with the present invention is modular, allowing for better scalability and precision. At analysis time, previously-computed library summaries provide permission requirements in response to the arguments computed by the analysis, eliminating the need for reanalyzing libraries. For example, in Java and the Common Language Runtime (CLR), a permission is characterized by strings that uniquely qualify the resources it guards. A sound static analyzer that does not model string computations will have to over-approximate permissions, resulting in potential violations of the Principle of Least Privilege. Systems and methods in accordance with the present invention include a string analysis that models the most common string operations, including concatenation, case change and substring extraction.

A novel integration of program slicing and string analysis enhances precision by disambiguating permission propagation paths. The permission analysis of the present invention is integrated as part of a tool called String-Sensitive Demand-Driven Authorization Analysis (S2D2A2). The implementation of S2D2A2 can be used for both Java programs and other platforms, such as the CLR.

In accordance with one exemplary embodiment, the present invention is directed to a method for automatic identification and evaluation of access-control policies. This method includes using static analysis to configure an access-control policy for a program running on a computing platform and having a plurality of components. Each component includes methods and classes. In addition, a combination of string analysis and a demand-driven-precision permission-tracking algorithm is used to reduce the number of permissions in the access-control policy generated by the static analysis that are not actually needed. The permissions in the access-control policy are used to perform security-sensitive operations within the computing system.

In one embodiment, the access control policy includes a plurality of permissions. Each permission includes strings that uniquely qualify resources within the computing system guarded by that permission. In one embodiment, use of the combination of string analysis and a demand-driven permission tracking algorithm includes using a string analysis that models all the possible string operations supported by the underlying language. Alternatively, use of the combination of string analysis and a demand-driven permission tracking algorithm includes using program slicing in combination with string analysis to disambiguate permission propagation paths. In one embodiment, the access control policy includes a minimum set of privileges necessary to prevent the program from entering an authorization error state.

In one embodiment, using static analysis includes identifying a plurality of libraries such that each library includes a subset of the methods of the program and constructing static summaries for each library to model access-control-enforcement mechanisms directly at the methods within each library that cause an access-control-enforcement to be performed when invoked. In one embodiment, using static analysis includes identifying a plurality of libraries such that each library includes a subset of the methods of the program and inducing an access control policy in each library that is a union of permission sets for all methods within that library.

In one embodiment, using static analysis includes creating a callgraph for each library such that each callgraph includes a plurality of nodes and each node corresponds to one method within the library and identifying permission sets for each method in each library as a union of permissions in a group of nodes in the callgraph containing that method. The group of nodes represents a set of all possible executions of the library by a given client. In one embodiment, the library summaries are used to model access-control-enforcement mechanisms for permissions, and permissions are granted to components of the program in accordance with the modeled access-control-enforcement mechanisms.

In one embodiment, a plurality of libraries are identified such that each library includes a subset of the methods of the program. A callgraph is created for each library such that each callgraph includes a plurality of nodes and each node corresponds to one method within the library, and a subset of callgraph nodes having an over-approximation of the methods within that library that cause an access-control-enforcement to be performed when invoked is identified for each library. In one embodiment, each subset of callgraph nodes is partitioned into three partitions. These the three partitions are a first partition containing nodes representing methods requiring constant permissions, a second partition containing nodes representing methods that require string-parameterized permissions having characterization dependent upon one or more string parameters passed by a client and a third partition containing nodes representing methods that require string-parameterized permissions having characterization dependent upon one or more non-string parameters passed by the client.

In one embodiment, the constant permissions comprise permissions having no parameters or permissions include string-constant parameters. In one embodiment, permissions are determined for methods at nodes in the first partition using a simple backwards dataflow problem within the callgraph. In another embodiment, permission for methods at nodes in the second partition are determined by using string analysis to generate a language representing possible values assigned to each parameter of each method that causes an access-control-enforcement to be performed when invoked and using program-slicing to track interprocedural dataflows across stacks.

BRIEF DESCRIPTION OF THE DRAWINGS

FIG. 1 is an embodiment of the code of two Java classes, Library and PrivWrite;

FIG. 2 is an embodiment of the code of client Enterprise;

FIG. 3 is an embodiment of the code of client School;

FIG. 4 is an embodiment of an instrumented concrete eager semantics for stack inspection in accordance with the present invention;

FIG. 5 is a summary of System.getProperty;

FIG. 6 is a sample program and production rules; and

DETAILED DESCRIPTION

Figure 7:
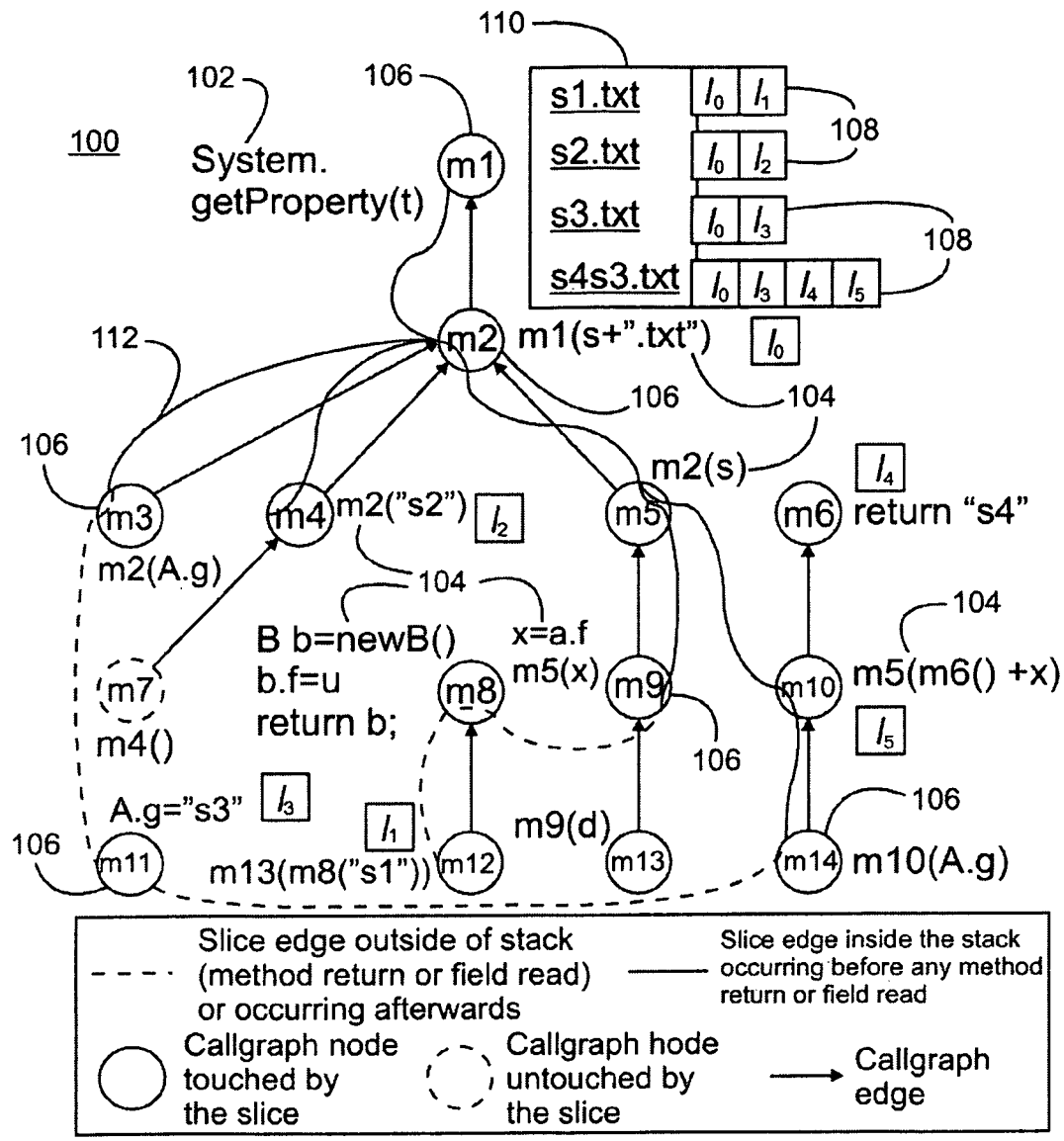
FIG. 7 is a schematic representation of an embodiment of callgraph of a program calling security-sensitive method System.getProperty.

This invention directed to detecting access-control requirements in any access-control system. The embodiment described in this document applies, in particular, to access-control systems implemented as stack inspections, such as the ones of Java and the Common Language Runtime (CLR). Referring to FIG. 1, an embodiment of the code of two Java classes, Library and PrivWrite is illustrated. The class Library exposes a public application program interface (API), createSocket, which constructs Socket objects on behalf of its clients. The codes of two clients, Enterprise and School, are illustrated in FIGS. 2 and 3 respectively. At run time, these clients will require SocketPermissions to resolve the names and connect to port 80 of hosts "ibm.com" and "rutgers.edu", respectively.

Upon constructing a Socket object on behalf of its clients, Library logs the operation to a file. To prevent its clients from requiring the FilePermission to write to the log file—a permission that a maliciously crafted client could misuse, for example, to erase the contents of the log file or log false information in it—Library creates an instance of PrivWrite and passes it to doPrivileged. At run time, doPrivileged invokes the run method of that PrivWrite object, and when the stack inspection is performed to verify that all the callers on stack have been granted the necessary FilePermission, the stack walk will stop at createSocket. Client code will be exempted from the FilePermission requirements.

A minimal security policy that allows the program to run without any authorization failure is illustrated in Table 1. Although this program is quite simple, configuring its security policy requires computing non-trivial string operations, accounting for privilege-asserting code and distinguishing the SocketPermission needed by School from the one needed by Enterprise. Things are more complicated when programs are multithreaded and involve thousands of classes, partitioned in numerous security domains, and forming long sequences of method invocations.

TABLE 1

Security Policy for Sample Program

| Permissions | Classes | | | |
|---|---|---|---|---|
| | Enterprise | School | Library | PrivWrite |
| java.net.SocketPermission "ibm.com", "resolve" | * | | * | |
| java.net.SocketPermission "ibm.com:80", "connect" | * | | * | |
| java.net.SocketPermission "rutgers.edu", "resolve" | | * | * | |
| java.net.SocketPermission " rutgers.edu: 80 ", "connect" | | * | * | |
| java.io.FilePermission "C:/log.txt", "write" | | | * | * |

For performance and scalability, implementations of Java and the CLR have adopted a lazy semantics for stack inspection. Security information is not passed across method calls, but retrieved on demand at authorization checkpoints. This lazy semantics is equivalent to an eager semantics in which security information is passed across method calls, ready to be used when needed at authorization checkpoints. Systems and methods in accordance with the present invention, utilize an eager semantics for stack inspection that models all the variants of stack inspection, including multithreaded code, and accounts for the differences between Java and the CLR.

In Java and the CLR, a permission can guard more than one physical resource. Thus, permissions are complex structures and carry an implication ordering. For example, the resource set guarded by java.io.SocketPermission "*:80", "connect, resolve" is a superset of the one guarded by java.io.SocketPermission "ibm.com", "connect". A simple concrete representation is used. Instead of reasoning about permissions in Java and the CLR, the universe P of atomic permissions is considered. Each atomic permission guards an individual resource. This formulation makes the connection with stack inspection more transparent and allows the use of the intuitive $2^P$ powerset lattice.

Given a program p with sets of classes C and methods M, an access-control policy for p is a function $\pi:M\to 2^P$. Intuitively, $\pi$ grants every method m a set of permissions $\pi(m)$. If $\pi(m)=\emptyset$, m is completely untrusted. Typically, in Java and the CLR, permissions are not granted to methods, but, with less granularity, to classes. In those cases, an access-control policy can be obtained as follows: if m∈M is declared in c∈C, and c has been granted set of permissions P, then $\pi(m):=P$. In other words, any method is granted the permissions granted to its declaring class.

Referring to FIG. 4, an instrumented concrete eager semantics is defined to describe the behavior of a program under an access-control policy enforced by stack inspection. A standard concrete semantics is assumed for a program in the underlying language, where the program state includes a program counter, stack, heap, local variables and global variables. The program state is additionally instrumented with a stack w of dynamically held permissions. The stack alphabet is $2^P$; each $\sigma \in 2^P$ represents the set of permissions that an execution may hold at a particular point. In FIG. 4, the convention is adopted that the stack grows from right to left.

In addition, the program state is augmented with the set T of currently instantiated Thread objects and a function $\alpha:T\to 2^P$ that maps each Thread in T to its security context. If S is the program configuration under the standard concrete semantics, then $(S,w,T,\alpha)$ is the program configuration under the instrumented concrete semantics.

When the main method m' of the program is invoked, the set of Thread instances instantiated so far is the singleton $T_0=\{t_0\}$, where $t_0$ is the Thread instance created by the program launcher and representing the thread of execution of the main method. The function mapping Thread instances to their security contexts is $\alpha_0$, with $\alpha_0(t_0)=P$, representing the fact that the main thread, not having a parent thread, is only going to be constrained based on the methods that will appear on its stack when an authorization check is performed.

The instrumentation for an execution x is defined as follows. Given a configuration $\langle S,w,T,\alpha\rangle$, a transition of the instrumented concrete semantics into a configuration $\langle S',w',T',\alpha'\rangle$, is denoted by $\langle S,w,T,\alpha\rangle \Rightarrow \langle S',w',T',\alpha'\rangle$, assuming that S' is the updated configuration according to the standard concrete semantics applied to S. Since the only operations that affect the instrumentation are method calls and returns, only the effects of these operations are described. Such effects change the instrumentation based on which methods are involved in the invocation, according to the stack-inspection rules presented herein.

In general, when a method m invokes another method m', the set of permissions $\sigma$ held at the top of the instrumentation stack w is intersected with $\pi(m')$, and this new set of permissions is pushed onto the top of the stack. The top of w is the authorization token used by checkPermission in Java and Demand in the CLR to perform the authorization check.

If m' is the constructor of a new Thread object, then the new Thread instance, t, is added to T, and function $\alpha$ is augmented to map t to the current security context. When the start method is called on t, that causes a call to the run method. At that point, the authorization token is intersected with $\alpha(t)$.

If m' is the privilege-asserting API, with a set of permissions Q, then what gets pushed on the top of the stack is $\pi(m)\cap Q$. Therefore, all the permission sets that were intersected to compute $\sigma$ up to that point are stripped away, except for $\pi(m)$. This also ensures that no method can assert permissions that it was not granted. In fact, if $\exists q\in Q: q\notin \pi(m)$, then $q\notin \pi(m)\cap Q$, and a stack inspection for q will cause the program to enter the ERROR state.

Unlike Assert in the CLR, Java's doPrivileged cannot be parameterized with a set Q of Permission objects. When a Permission object q is demanded, the stack inspection is stopped at the stack frame preceding doPrivileged indiscriminately, as long as $q\in \pi(m)$. Conversely, in the CLR, it must be $q\in \pi(m)\cap Q$ since the CLR allows specifying exactly the set Q of permissions being asserted, and a method m can only assert the permissions in $Q\cap \pi(m)$. The unified treatment of doPrivileged and Assert in the present invention assumes Q=P in the Java case.

Regarding the Principle of Least Privilege, an access-control policy $\pi$ for a program p is sufficient if for any execution x, x does not transition to an authorization ERROR state; insufficient otherwise. It is possible to define a partial order on the class of all the access-control policies on a program p. Given a program p with sets of methods M, a partial order on the class of all the access-control policies on p is defined as follows. Given two policies $\pi_1, \pi_2$, $\pi_1$ is less permissive than or equally permissive to $\pi_2$, written $\pi_1 \preceq \pi_2$, if $\pi_1(m) \subseteq \pi_2(m), \forall m \in M$. If $\pi_1 \preceq \pi_2 \wedge \exists m\in M: \pi_1(m)\neq \pi_2(m)$, $\pi_1$ is strictly less permissive than $\pi_2$, i.e., $\pi_1 \prec \pi_2$.

Intuitively, if $\pi_1 \prec \pi_2$, then $\pi_1$ is "stricter" than $\pi_2$; $\pi_1$ grants fewer privileges to the component providers. This allows reasoning about the Principle of Least Privilege; a policy should grant the minimum set of privileges necessary to prevent the program from entering the authorization ERROR state. More formally, a policy should be "minimal". An access-control policy $\pi$ sufficient for a program p is minimal if there exists no sufficient policy $\pi'$ for p such that $\pi' \prec \pi$; otherwise, $\pi$ is redundant.

Regarding static analysis, systems and methods in accordance with the present invention utilize a combination of modular static analysis, program slicing, and string analysis for precise and scalable permission-requirement identification. In component-based systems, access control is centralized. For example, in Java, all the security-sensitive functions trigger, directly or indirectly, a call to the checkPermission method on the instance of SecurityManager currently active on the system, passing it a Permission object. This function invokes AccessController.checkPermission, to perform the stack inspection. A context-insensitive callgraph represents all calls to the same method as one node. Thus, there will be only one node representing all the calls to the checkPermission methods on all the SecurityManager instances, and only one node representing all the calls to AccessController.check- Permission, without any regard to which Permission object parameter those methods are passed.

The components of the program illustrated above collectively require five permissions, as shown in Table 1. Modeling stack inspection as a simple backward dataflow problem in a context-insensitive callgraph would not effectively disambiguate the different propagation paths of those permission requirements, and every caller would be reported as requiring all the five permissions. Furthermore, it would not be possible to distinguish which permission is shielded by the doPrivileged call in createSocket. A security policy based on the results of this analysis would conservatively fill every cell of Table 1 with a star. A solution to this problem could be to use a more expensive context-sensitive approach, but that would limit the scalability of the analysis.

Systems and methods in accordance with the present invention improve on precision and scalability via the construction of static summaries for libraries. The programs are clients of the libraries. Since each library is only a subset of the entire program, each library can be preanalyzed using an aggressive context-sensitive algorithm, eliminating the need for reanalyzing that library at every library call. Once the static library summaries have been built, the permission analysis can start modeling stack inspections directly at the library entrypoints instead of starting from the access-control enforcer. This reduces any imprecision due to overlapping callgraph library paths.

To construct library entrypoint summaries, each library $l$ is analyzed as an incomplete program, considering all its public and protected methods as possible entrypoints. A callgraph $G=(N,E)$ is defined to represent the set of all possible executions of $l$ with an arbitrary client. Restrictions on the context-sensitivity level adopted in the callgraph are not imposed. If the callgraph is context-insensitive, then each method $m$ in the program under analysis is represented by a single node $n \in N$, and if $n_1, n_2 \in N$, then $(n_1,n_2) \in E$ if and only if the method represented by $n_1$ contains an invoke instruction whose target is the method represented by $n_2$. A callgraph may also be context-sensitive, in which case a single method $m$ may be represented by more than one node in the callgraph, depending on its calling contexts (for example, the allocation sites of the receiver and parameters or a fixed-length call chain). The static analysis of the present invention applies to both context-sensitive and context-insensitive callgraphs, although embodiments illustrated herein utilize the 1-CFA context-sensitive algorithm.

Sets $N_1$ and $N_2$ can be defined as the subsets of the sets of nodes $N$ in the callgraph that correspond to the checkPermission/Demand and doPrivileged/Assert APIs, respectively. In addition, set $P'$ is a finite set of abstract memory locations partitioning the set of atomic permissions $P$ into disjoint sets. An element of $P'$ can be a Permission/IPermission allocation site, as in, for example, Andersen's analysis, L. O. Andersen, *Program Analysis and Specialization for the C Programming Language*, Ph.D Thesis, University of Copenhagen, May 1994. Each element of $P'$ is interpreted as a set of atomic permissions—$\forall p' \in P', p' \in 2^P$.

The stack inspection mechanism can be modeled as a two-phase dataflow problem. The first phase is a standard backward dataflow propagation. $Gen(n):=\emptyset, \forall n \in N \setminus N_1$. If $n \in N_1$, let $Q \subseteq P'$ be the set of Permission/IPermission object abstractions that, according to the static analysis, can flow to the parameter of checkPermission/Demand in the context represented by $n$, if any. In this case, $Gen(n):=Q$. Furthermore, $Kill(n):=\emptyset, \forall n \in N \setminus N_2$. If $n \in N_2$, let $Q \subseteq P'$ be the set of Permission/IPermission object abstractions that, according to the static analysis, can flow to the parameter of doPrivileged/Assert in the context represented by $n$, if any. In this case, $Kill(n):=Q$. As observed above, doPrivileged is not parameterized based on permissions. Thus, in Java, $Kill(n)=P'$, $\forall n \in N_2$.

The dataflow equations for the first phase are defined as follows:

$$Out(n) := (In(n) \setminus Kill(n)) \cup Gen(n) \qquad (1)$$

$$In(n) := \bigcup_{m \in \Gamma^+(n)} Out(m) \qquad (2)$$

for every $n \in N$, where $\Gamma^+: N \to 2^N$ is the successor function in G, defined by $\Gamma^+(n):=\{n' \in N | (n,n') \in E\}$.

Tarski's Theorem guarantees that the recursive computation of the solutions of Equations (1) and (2) converges to a fixed point in $O(|E||P'|)$ time, given that the height $H(2^{P'})$ of the lattice $2^{P'}$ is $|P'|$, and to reach a fixed point, each edge of G can be traversed at most $H(2^{P'})$ times.

The first phase of the dataflow propagation problem modeled by Equations (1) and (2) stopped permission propagation at privilege-asserting code. However, according to the stack-inspection semantics, the code performing a privilege-asserting call needs to be granted the permissions it shields. The second phase models this behavior with a one-step, non-recursive backward propagation of permission requirements, to be performed upon convergence of the recursive computation of the solutions of Equations (1) and (2), as described by Equation (3):

$$In(n) := In(n) \cup \bigcup_{n_2 \in \Gamma^+(n) \cap N_2} In(n_2) \qquad (3)$$

for each $n \in N$. Solving Equation (3) has a worst-case time complexity of $O(|E|)$ since each edge will be traversed at most once.

To detect what permissions are needed by each method, a function $\pi': M \to 2^{P'}$ is defined as follows: for every $m \in M$, if $m$ is represented by nodes $n_1, n_2, \ldots, n_k \in N$, then $\pi'(m):=\cup_{i=1}^{k} In(n_i)$. If $m$ is not represented by any node in the callgraph ($m$ is unreachable), then $k=0$ and $\pi'(m)=\emptyset$. If the callgraph is context-insensitive, then $k \le 1$. The static analysis presented herein induces an access-control policy $\tilde{\pi}: M \to 2^P$ on $l$ defined by $\tilde{\pi}(m):=\cup_{Q \in \pi'(m)}, \forall m \in M$.

Two theorems illustrate that the library analysis of the present invention is sound for sufficiency and complete for redundancy. In the first theorem, $\tilde{\pi}$ is sufficient for $l$, and therefore sound. In the second theorem, $\pi: M \to 2^P$ is a sufficient access-control policy for $l$. If $\tilde{\pi} \prec \pi$, then $\pi$ is redundant.

A summary for a library $l$ constructed as described above identifies a subset $N_3 \subseteq N$ of nodes, overapproximating the set of security-sensitive entrypoints of $l$, i.e., methods that, when invoked, cause a stack inspection to be performed. The summary also identifies, for each entrypoint $m$, the set $\tilde{\pi}(m)$ of the permissions assigned to $m$ by the policy $\tilde{\pi}$ induced by the static analysis. The soundness theorem guarantees that $\tilde{\pi}(m)$ is a superset of the set of permissions that will be required to invoke $m$ at run time.

If a program $p$ includes a library $l$ that has been summarized, a backward dataflow permission analysis for $p$ can be initialized at the callgraph nodes in set $N_3 \subseteq N$ representing the entrypoints of $l$, as opposed to the nodes in $N_1$. As observed above, this will avoid the conservative results due to callgraph paths overlapping on one or more nodes representing methods of l. However, summaries of l do not solve the conservativeness problems generated by paths overlapping on nodes outside of l, in the callgraph representing the executions of clients of l. In the Library and PrivWrite classes discussed above, summarizing the permission requirements of the constructors of Socket and FileOutputStream would be sufficient to identify that the only permission shielded by the call to doPrivileged in createSocket is FilePermission "C:/log.txt", "write". However, it would not be sufficient to disambiguate the four SocketPermission requirements for connectToEnterprise and connectToSchool, and the analysis would conservatively tag every node in both paths as requiring all four of them. Resorting to use of expensive context sensitivity may solve this problem but is likely to make the analysis unscalable. Exemplary embodiments of systems and methods in accordance with the present invention utilize a complex static-analysis algorithm for permission analysis of client code based on callgraph analysis, pointer analysis, program slicing, and string analysis.

$N_3$ is partitioned in subsets $N_{3,1}, N_{3,2}, N_{3,3}$. Nodes in $N_{3,1}$ represent methods that require "constant permissions". A constant permission is either a permission with no parameters, for example, java.security.AllPermission, or a permission with string constant parameters where the constants are defined by the access-control enforcer and do not depend on the client. A callgraph node representing a call to ClassLoader.<init> is in $N_{3,1}$ because the permission requirement it generates is java.lang.RuntimePermission "createClassLoader", and createClassLoader is a string constant defined by the Java runtime.

Nodes in $N_{3,2}$ represent methods that require String-parameterized permissions, whose characterization depends on one or more String parameters passed by a client of the library, i.e., the program. A callgraph node representing a call to Socket .<init> is in $N_{3,2}$ because its String parameter, for example, "ibm.com", flows directly to a parameter of the required permission, as in java.net.SocketPermission "ibm.com", "resolve".

Nodes in $N_{3,3}$ represent methods that require non-String-parameterized permissions, whose characterization depends on one or more non-String parameters passed by the client. For example, any callgraph node representing a call to the FileOutputStream constructor with a File parameter is in $N_{3,3}$. The File object parameter wraps the String object representing the file name. That String object becomes the target parameter of the required permission, as in java.io.FilePermission "C:/log.txt", "write".

The static permission analysis for client code works by modeling stack inspection, but treats these three partitions differently. Permission requirements generated at nodes in $N_{3,1}$ can be modeled as a simple backwards dataflow problem as in Equations (1) and (2). Detecting permission requirements generated at nodes in $N_{3,2}$ is more complicated since it is necessary to distinguish the propagation across different paths of permission requirements that differ by their parameters.

The ingredients of the analysis variations of a string analysis that for every program variable of type String can generate a Context-Free Language (CFL) representing possible values assigned to that variable and a program-slicing technique that tracks interprocedural dataflows across stacks. The analysis proceeds as follows: The string analysis reports the CFL of the possible values for the String objects parameters to the security-sensitive call. Referring to FIG. 7, the callgraph 100 is illustrated for a program calling security-sensitive method System.getProperty 102. The relevant code 104 in the methods corresponding to the nodes 106 in the callgraph is provided. The possible string values computed by the string analysis for the parameter to getProperty are "s1.txt", "s2.txt", "s3.txt", and "s4s3.txt".

The string analysis is augmented with a labeling feature that for every string value reports a set of labels 108. Each label in the set of labels represents either a string definition or a primitive string operation that potentially affected the final string value. As illustrated, the four string values 110 listed above for the method System.getProperty 102 are mapped to sets of labels $\{l_0, l_1\}$, $\{l_0, l_2\}$, $\{l_0, l_3\}$ and $\{l_0, l_3, l_4, l_5\}$. Each of the values in the CFL is used to instantiate a permission requirement, for example, PropertyPermission "s1.txt", "read". If the security-sensitive method takes more than one String object parameter, the Cartesian product of the sets of the different parameter values will be taken, and a permission is instantiated for each element of the Cartesian product.

An analysis that agglomerates all these permissions is unsatisfactory since it may lead to violations of the Principle of Least Privilege. Therefore, for each permission requirement, it is necessary to identify its possible propagation stacks. To do this, a backward slice rooted at the parameter passed to the security-sensitive method is computed and then the backward slice is followed as this overlaps possible stacks of execution. The result is a stack slice 112, represented in FIG. 7 with solid, curved edges. Where the slice stop overlapping with any stack, e.g., by coming to an end or going through a method return or a field-read operation, the string analysis is interrogated to collect the set of labels that may participate in the definition of the resulting string value. Points of interrogation are m3, m9, m14 (field reads), m4 (slice end), and m10 (method return).

Then some of the nodes of the stack slice are annotated with sets of labels. For example, m2→$\{l_0\}$, m4→$\{l_2\}$, m3→$\{l_3\}$, m2→$\{l_0\}$, m9→$\{l_1\}$, m10→$\{l_4, l_5\}$. The sets of labels are then propagated in a backwards dataflow problem through the stack slice, performing set unions at the merge points. When a fixed point is reached, the stack slice entry-points are annotated with sets of labels. Those sets are used to distinguish the possible permission requirements at those entrypoints. For example, as illustrated in FIG. 7, client entry-points m3, m7, m12, m14 are tagged as requiring the following sets of permissions, respectively:

{java.util.PropertyPermission "s3.txt", "read"}
{java.util.PropertyPermission "s2.txt", "read"}
{java.util.PropertyPermission "s1.txt", "read"}
{java.util.PropertyPermission "s4s3.txt", "read"; java.util.PropertyPermission "s3.txt", "read"}

Those requirements are then propagated forward in the stack slice and then backwards in the callgraph graph, still performing set, unions at the entrypoints. More formally, a string analysis S for a call graph G=(N,E) is a tuple $(S_v, S_o, S_s, S_c)$ where $S_v, S_o$ are two sets and $S_s, S_c$ are two functions such that:

$S_v \leftarrow$ all primitive string components in G
$S_o \leftarrow$ all primitive string operations in G $$S_s(w) \leftarrow \{x | x \in DNF(CFL(w))\}$$

$$S_c \leftarrow \{y | y \in S_o \cup S_v \wedge \text{value of } y \text{ may appear in } x\}$$

where w is a program value in G, and DNF(CFL(w)) is the set of disjuncts in the Disjunctive Normal Form (DNF) representation of the Context Free Language (CFL) derived by S to approximate the strings potentially held by w. For each such disjunct x, $S_c(x)$ returns the constituent components that may have been used in the computation of x. The constituents have two forms: $S_v$ is the set of manifest string constants and string input parameters in G, and $S_o$ is the set of result values of all primitive string operations in G. Thus, $S_c(x)$ denotes all primitive string components and all applied string operations that together gave rise to x.

A stack slice $\Sigma(v,n)$ is a backward slice with respect to a local variable or parameter v and node n that follows only definitions within a given program stack, stopping at any other kind of definition, such as a read from the heap or a function return value. In accordance with the present invention, all values in the stack fall into four categories, and the stack slice is defined as follows in terms of them:

$$\text{Constant } c \Leftarrow \sum (c, n) \leftarrow \{c\}$$

$$\text{Parameter } p \Leftarrow \sum (p, n) \leftarrow \{p\} \cup \bigcup_{v(x) \in \Delta^-(n,p)} \sum (x, n)$$

Primitive string operation $r =$ $$f(v_1, \ldots, v_n) \Leftarrow \sum (r, n) \leftarrow \{r\} \cup \bigcup_{v_i} \sum (v_i, n)$$

$$\text{Other } v \Leftarrow \sum (v, n) \leftarrow \{v\}$$

where $\rightarrow$ denotes edges in $G=(N,E)$, function v maps any local variable or parameter to its defining callgraph nodes, and $\Delta^-(n,p):=\{v(x)|n\rightarrow^*v(x)\in E \wedge v(x)\rightarrow v(p)\in E\}$. In addition, $\tau(v)$ is defined to return which of the four categories a given v belongs, for any v from a stack slice.

As used herein, permissions pertains to sensitive nodes. A sensitive nodes has two properties: the sensitive value $v_s$ that holds permissions and the set of permissions required, $p_s$. For simplicity, the set of permissions is determined by the set of strings reaching $v_s$.

A safe approximation of the required permissions is defined by observing that only strings actually read onto, or computed in, a given stack somewhere can be passed up that stack to a sensitive operation. Thus, if the components of all strings read onto the stack and all operations on the stack itself are computed, any string can be filtered at the sensitive operation that is composed in part of any other operation or component. Based on that observation, a stack slice $\Sigma(v_s,n)$ is taken that covers all dataflow through stacks from n to the sensitive operation in s. Then all the components of all the strings read into the slice and the operations on them are computed. Those components are used to prune the full set of strings at the sensitive operation as determined by the overall string analysis. Hence, the set of strings needed for the stacks rooted at n is as defined follows:

$$CS(v, n) \leftarrow \left\{ c \;\middle|\; \exists x: \begin{array}{l} c \in S_c(x) \wedge \\ x \in \sum (v, n) \wedge \\ \tau(x) \in \{\text{constant, other}\} \end{array} \right\}$$

where CS is the set of components of strings read into the stack. These components are the only ones that can appear in strings passed to the sensitive operation. Therefore, permissions are needed in the stack rooted at n only for strings that contain those components. This is defined as $P(v_s,n)$:

$$P(v_s,n)=\{s|s\in S_s(v_s) \wedge (S_c(s) \cap CS(v_s,n))\neq\emptyset\}$$

Exemplary embodiments of systems and methods in accordance with the present invention utilize a functional modularity. Building functional summaries of a library l allows an aggressive analysis of l and use of those summaries in the analysis of a client p, i.e., a program, of the library l. To disambiguate permission-propagation paths inside the library, the S2D2A2 analysis of libraries adopts the 1-CFA context-sensitive callgraph-construction algorithm. This algorithm may be too expensive even for a library. For example, the 1-CFA implementation could not scale to the standard Java run-time libraries. Fortunately, permission requirements are totally functional, in the sense that the permissions required by a program when invoking the entrypoint of the standard Java run-time library depend at most on the receiver of the entrypoint method call and the parameters passed to it. As far as summary construction is concerned, there are no side effects due to interactions with the heap or other entrypoint method calls. For this reason, partitioning the entrypoints of the library into smaller subsets, and repeatedly running the summary-construction analysis on the callgraphs generated based on those partitions is sound, in the sense that no permission requirement will be lost. S2D2A2 allows several partitioning policies. An effective way to partition the standard library entrypoints is by package.

Summaries are different depending on whether the method being summarized requires a constant permission, a String-parameterized permission or a non-String-parameterized permission. For the constant permission case, the summary is straightforward since it simply maps the method to a constant parameter.

The eXtensible Markup Language (XML) code snippet in FIG. 5 shows the summary automatically constructed by S2D2A2 for java.lang.System.getProperty, which is a method of type for a String-parameterized permission. Any call to this method requires a java.util.PropertyPermission, which is qualified by two strings: the target (the name of the property) and the action (the mode of access). The target (permission="1") is obtained as the first parameter passed to the getProperty method (param-index method="1"), and may have to be the wildcard character (*) if the parameter value is not available when the summary is used, or cannot be fully disambiguated. The action is always the string constant "read". S2D2A2 performs a dataflow dependence analysis to compute this mapping.

For methods of the non-String-parameterized permission type, the mapping is not so straightforward, and requires further intermediate mappings. For example, the main constructor of FileOutputStream takes a java.io.File object as a parameter, but an overloaded version of that constructor takes a String object parameter (FIG. 1), uses it to construct a File object, and then passes that File object to the main constructor, which extracts the file name from the File object, and then uses it to construct a FilePermission object. Here, the dependencies are more complex, but S2D2A2 can still figure them out using a cascading dataflow dependence analysis that basically links the target of the FilePermission to the file name value passed to the File object upon construction.

When the whole program is available for the analysis, a library l that is in the analysis scope but has already been summarized does not have to be reanalyzed. A backward dataflow problem can be instantiated starting from the security-sensitive entrypoints of the summarized library. This eliminates those imprecisions due to paths merging inside the library callgraph but not those due to paths merging inside the client callgraph. Furthermore, for the analysis of client programs, S2D2A2 cannot afford the expensive 1-CFA algorithm and uses 0-1-CFA instead. That is because clients can be much larger than libraries, and also because clients do not support entrypoint partitioning. As discussed above, S2A2D2 uses program slicing to track interprocedural dataflow of security-sensitive information across the stacks and disambiguate paths that merge inside client callgraphs. The slicing algorithm used in an embodiment of this invention is built on top of WALA, http://wala.sourceforge.net, and has the following characteristics: it tracks data dependencies but safely ignore control dependencies and it is context-insensitive, which means that it does not report explicit edges for heap dependencies. Heap relationships are conservatively approximated without any context.

It is very common for a fully-qualified file name to be specified in a program as something like dir+File.separator+ fileName. A permission analyzer that does not perform string analysis will have to conservatively approximate the permission to read such a file as the permission to read all the files of the file system—an overapproximation that may cause violations of the Principle of Least Privilege. As a software-engineering contribution, the analysis utilized in the present invention seamlessly integrates a sophisticated static string analysis that reduces conservativeness by identifying permission requirements more precisely.

String analysis is a family of static program analyses that approximate the possible strings of program variables or output arising at run time. The string analysis algorithm of the present invention is augmented with the novel labeling feature to show how strings are constructed. The string analysis of the present invention produces a Context-Free Grammar (CFG) that represents possible string values assigned to program variables. The CFG is deduced by solving the subset constraints among the sets of strings assigned to program variables. Labeling starts by associating labels with every character and approximated string operations while translating a program into production rules. Every label is determined based on the program locations corresponding to string creations and manipulations. The labeled approximated string operations are modeled so as to translate a CFG containing labeled characters and to propagate the labels of the approximated string operations and the labeled characters to the other characters. The propagation of the label is implemented by simply accumulating program locations and calculating label set unions.

Referring to FIG. 6, a sample program and the production rules translated from it are illustrated. Superscript numbers are program locations indicating where the string characters are created and manipulated. Labels 1 and 2 on characters x, y, z and a indicate that those characters are created on program locations 1 and 2, respectively. The approximated function concat has label 3 to indicate that concatenation of strings is performed on program location 3. Label 4 represents a program location on which substring is applied. The labeled approximated function concat$^3$ concatenates two CFGs and propagates label 3 to every character. Likewise, substring$^4$ propagates label 4.

As the result of the application of the labeled approximated function, the following CFG is obtained:

$$S'_a \rightarrow z^{\{1,4\}}, S'_a a^{\{2,3,4\}}, S_r \rightarrow S'_a$$

This CFG represents the set of strings $$\{z^{\{1,4\}}, za^{\{1,2,3,4\}}, zaa^{\{1,2,3,4\}}, \ldots\}$$

Consequently, string x is constructed only through locations 1, 3, and 4, while the other strings are constructed through all the locations.

EXAMPLE

S2D2A2 was used on the following applications: JPDStore, JPTApi, Java Integrity, Javacup and Ganymede. The results reported in Table 2 are from running S2D2A2 on a Lenovo T61P ThinkPad with an Intel T7700 Core Duo 2.40 GHz processor, 3 GB of Random Access Memory (RAM), and Microsoft Windows XP SP2 operating system. S2D2A2 was run on an IBM Java Standard Edition (SE) VI.4.2_05 Runtime Environment, and comparing the results with the permission analysis of SWORD4J. For each application, Table 2 shows the application size, which does not include the libraries, the size of the generated callgraph, the time taken to perform the analysis and the number of permissions detected.

Among these permissions, those that are instantiated starting from the library entrypoints are highlighted, based on the specific parameters passed by the client code. Among the instantiated permissions, those that depend on string constants are not counted, which both S2D2A2 and SWORD4J can detect. Rather, the focus is on those that require string analysis. Since SWORD4J does not model string operations, each permission precisely instantiated by S2D2A2 is overapproximated by SWORD4J with the conservative top value of that permission type (typically a wildcard, *). This type of approximation can easily lead to violations of the Principle of Least Privilege. For JPDStore, many more string operations were observed in the code compared to the other projects. That directly implies a greater number of instantiated permissions leading to more precision. That precision is not achievable by SWORD4J due its design limitations.

The experiments involve different projects downloaded from SourceForge. Besides the precision gain, the benefits of the modular analysis in terms of running time are apparent. This first stage of the analysis conservatively identifies all the permissions required for all the possible entrypoints of the library (here, the Java Runtime). Thus, the callgraph construction can ignore any calls not leading to a summary. This positively influences the running time of S2D2A2, which outperforms SWORD4J by an average factor of 5 despite its enhanced precision, which involves expensive analyses such as program slicing and string analysis. Furthermore, S2D2A2 manages not only to reduce the number of false positives of SWORD4J, but also the number of false negatives. In fact, for scalability reasons, SWORD4J unsoundly excludes from the analysis scope several packages, such as java.awt and javax.swing. Any permission in those packages as well as any permission required by those packages will not be reported by SWORD4J. Conversely, S2D2A2 does not perform any exclusion and soundly models the execution of any application.

Exemplary embodiments of systems and methods in accordance with the present invention utilize a static analysis for identification of permission-requirements on stack-inspection authorization systems, where active attackers can easily inject malicious code inside a program. The analysis employs functional modularity for improved scalability. To enhance precision, the analysis utilizes program slicing to detect the origin of each parameter passed to a security-sensitive function. Furthermore, since strings are essential when defining permissions, the analysis integrates a sophisticated string analysis that models string computations.

TABLE 2

Empirical Results of S2D2A2 Analysis

| | SWORD4J | | | | S2D2A2 | | | |
|---|---|---|---|---|---|---|---|---|
| | CG | Time | Permissions | | CG | Time | Permissions | |
| Application | Nodes | sec. | Detected | Instantiated | Nodes | sec. | Detected | Instantiated |
| JPDStore | 28524 | 117 | 11 | — | 1552 | 11 | 32 | 13 |
| JPTApi | 26871 | 109 | 9 | — | 69 | 9 | 13 | 2 |
| Java Integrity | 27427 | 70 | 9 | — | 243 | 24 | 13 | 2 |
| JavaCup | 32893 | 128 | 5 | — | 591 | 19 | 9 | 5 |
| Ganymede | 35820 | 93 | 15 | — | 798 | 34 | 21 | 2 |

Methods and systems in accordance with exemplary embodiments of the present invention can take the form of an entirely hardware embodiment, an entirely software embodiment or an embodiment containing both hardware and software elements. In a preferred embodiment, the invention is implemented in software, which includes but is not limited to firmware, resident software and microcode. In addition, exemplary methods and systems can take the form of a computer program product accessible from a computer-usable or computer-readable medium providing program code for use by or in connection with a computer, logical processing unit or any instruction execution system. For the purposes of this description, a computer-usable or computer-readable medium can be any apparatus that can contain, store, communicate, propagate, or transport the program for use by or in connection with the instruction execution system, apparatus, or device. Suitable computer-usable or computer readable mediums include, but are not limited to, electronic, magnetic, optical, electromagnetic, infrared, or semiconductor systems (or apparatuses or devices) or propagation mediums. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Suitable data processing systems for storing and/or executing program code include, but are not limited to, at least one processor coupled directly or indirectly to memory elements through a system bus. The memory elements include local memory employed during actual execution of the program code, bulk storage, and cache memories, which provide temporary storage of at least some program code in order to reduce the number of times code must be retrieved from bulk storage during execution. Input/output or I/O devices, including but not limited to keyboards, displays and pointing devices, can be coupled to the system either directly or through intervening I/O controllers. Exemplary embodiments of the methods and systems in accordance with the present invention also include network adapters coupled to the system to enable the data processing system to become coupled to other data processing systems or remote printers or storage devices through intervening private or public networks. Suitable currently available types of network adapters include, but are not limited to, modems, cable modems, DSL modems, Ethernet cards and combinations thereof.

In one embodiment, the present invention is directed to a machine-readable or computer-readable medium containing a machine-executable or computer-executable code that when read by a machine or computer causes the machine or computer to perform a method for automatic identification and evaluation of access-control policies in accordance with exemplary embodiments of the present invention and to the computer-executable code itself. The machine-readable or computer-readable code can be any type of code or language capable of being read and executed by the machine or computer and can be expressed in any suitable language or syntax known and available in the art including machine languages, assembler languages, higher level languages, object oriented languages and scripting languages. The computer-executable code can be stored on any suitable storage medium or database, including databases disposed within, in communication with and accessible by computer networks utilized by systems in accordance with the present invention and can be executed on any suitable hardware platform as are known and available in the art including the control systems used to control the presentations of the present invention.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s) and steps or elements from methods in accordance with the present invention can be executed or performed in any suitable order. Therefore, it will be understood that the appended claims are intended to cover all such modifications and embodiments, which would come within the spirit and scope of the present invention.

What is claimed is:

1. A method for automatic identification and evaluation of access-control policies using a computing system, the method comprising:
   using static analysis to configure an access-control policy for a program running on a computing platform and comprising a plurality of components, each component comprising methods and classes; and
   using a combination of string analysis and a demand-driven-precision permission-tracking algorithm to reduce the number of permissions in the access-control policy generated by the static analysis that are not actually needed.

2. The method of claim 1, wherein the access control policy comprises a plurality of permissions, each permission comprising strings that uniquely qualify resources within the computing system guarded by that permission.

3. The method of claim 1, wherein the step of using a combination of string analysis and a demand-driven permission tracking algorithm further comprises using a string analysis that models all the possible string operations supported by the underlying language.

4. The method of claim 1, wherein the step of using a combination of string analysis and a demand-driven permission tracking algorithm further comprises using program slicing in combination with string analysis to disambiguate permission propagation paths.

5. The method of claim 1, wherein the access control policy comprises a minimum set of privileges necessary to prevent the program from entering an authorization error state.

6. The method of claim 1, wherein the step of using static analysis further comprises:
identifying a plurality of libraries, each library comprising a subset of the methods of the program; and
constructing static summaries for each library to model access-control-enforcement mechanisms directly at the methods within each library that cause an access-control-enforcement to be performed when invoked.

7. The method of claim 1, wherein the step of using static analysis further comprises:
identifying a plurality of libraries, each library comprising a subset of the methods of the program; and
inducing an access control policy in each library that is a union of permission sets for all methods within that library.

8. The method of claim 7, wherein the step of using static analysis further comprises:
creating a callgraph for each library, each callgraph comprising a plurality of nodes, each node corresponding to one method within the library; and
identifying permission sets for each method in each library as a union of permissions in a group of nodes in the callgraph containing that method, the group of nodes representing a set of all possible executions of the library by a given client.

9. The method of claim 6, further comprising:
using the library summaries to model access-control-enforcement mechanisms for permissions; and granting permissions to components of the program in accordance with the modeled access-control-enforcement mechanisms.

10. The method of claim 1, wherein the method further comprises:
identifying a plurality of libraries, each library comprising a subset of the methods of the program;
creating a callgraph for each library, each callgraph comprising a plurality of nodes, each node corresponding to one method within the library; and
identifying for each library a subset of callgraph nodes comprising an over-approximation of the methods within that library that cause an access-control-enforcement to be performed when invoked.

11. The method of claim 10, further comprising partitioning each subset of callgraph nodes into three partitions, the three partitions comprising:
a first partition comprising nodes representing methods requiring constant permissions;
a second partition comprising nodes representing methods that require string-parameterized permissions having characterization dependent upon one or more string parameters passed by a client; and
a third partition comprising nodes representing methods that require string-parameterized permissions having characterization dependent upon one or more non-string parameters passed by the client.

12. The method of claim 11, wherein constant permissions comprise permissions having no parameters or permissions comprising string-constant parameters.

13. The method of claim 11, further comprising determining permissions for methods at nodes in the first partition using a simple backwards dataflow problem within the callgraph.

14. The method of claim 11, further comprising determining permission for methods at nodes in the second partition by:
using string analysis to generate a language representing possible values assigned to each parameter of each method that causes an access-control-enforcement to be performed when invoked; and
using program-slicing to track interprocedural dataflows across stacks.

15. A non-transitory computer-readable medium containing a computer-readable code that when read by a computer causes the computer to perform a method for automatic identification and evaluation of access-control policies, the method comprising:
using static analysis to configure an access-control policy for a program running on a computing platform and comprising a plurality of components, each component comprising methods and classes;
using a combination of string analysis and a demand-driven-precision permission-tracking algorithm to reduce the number of permissions in the access control policy generated by the static analysis that are not actually needed; and
using the permissions in the access-control policy to perform security-sensitive operations within the computing system.

16. The non-transitory computer-readable medium of claim 15, wherein the step of using static analysis further comprises:
identifying a plurality of libraries, each library comprising a subset of the methods of the program; and
constructing static summaries for each library by using an aggressive context sensitive algorithm to model access-control-enforcement mechanisms directly at the methods within each library that cause an access-control-enforcement to be performed when invoked.

17. The non-transitory computer-readable medium of claim 15, wherein the step of using static analysis further comprises:
identifying a plurality of libraries, each library comprising a subset of the methods of the program; and
inducing an access control policy in each library that is a union of permission sets for all methods within that library.

18. The non-transitory computer-readable medium of claim 17, wherein the step of using static analysis further comprises:
creating a callgraph for each library, each callgraph comprising a plurality of nodes, each node corresponding to one method within the library; and
identifying permission sets for each method in each library as a union of permissions in a group of nodes in the callgraph containing that method, the group of nodes representing a set of all possible executions of the library by a given client.

19. The non-transitory computer-readable medium of claim 16, further comprising:
using the library summaries to model access-control-enforcement mechanisms for permissions; and granting permissions to components of the program in accordance with the modeled access-control-enforcement mechanisms.

20. The non-transitory computer-readable medium of claim 15, wherein the method further comprises:
- identifying a plurality of libraries, each library comprising a subset of the methods of the program;
- creating a callgraph for each library, each callgraph comprising a plurality of nodes, each node corresponding to one method within the library; and
- identifying for each library a subset of callgraph nodes comprising an over-approximation of the methods within that library that cause an access-control-enforcement to be performed when invoked.

21. The non-transitory computer-readable medium of claim 20, further comprising partitioning each subset of callgraph nodes into three partitions, the three partitions comprising:
- a first partition comprising nodes representing methods requiring constant permissions;
- a second partition comprising nodes representing methods that require string-parameterized permissions having characterization dependent upon one or more string parameters passed by a client; and
- a third partition comprising nodes representing methods that require string-parameterized permissions having characterization dependent upon one or more non-string parameters passed by the client.

22. The non-transitory computer-readable medium of claim 21, wherein constant permissions comprise permissions having no parameters or permissions comprising string-constant parameters where constants are defined by an access-control enforcer and are client independent.

23. The non-transitory computer-readable medium of claim 21, further comprising determining permissions for methods at nodes in the first partition using a simple backwards dataflow problem within the callgraph.

24. The non-transitory computer-readable medium of claim 21, further comprising determining permission for methods at nodes in the second partition by:
- using string analysis to generate a language representing possible values assigned to each parameter of each method that causes an access-control-enforcement to be performed when invoked; and
- using program-slicing to track interprocedural dataflows across stacks.

* * * * *